United States Patent [19]

Eberly, Jr. et al.

[11] 4,303,500

[45] Dec. 1, 1981

[54] REFORMING WITH MULTIMETALLIC CATALYSTS

[75] Inventors: Paul E. Eberly, Jr.; Charles H. Mauldin; William C. Baird, Jr., all of Baton Rouge, La.

[73] Assignee: Exxon Research & Engineering Co., Florham Park, N.J.

[21] Appl. No.: 206,091

[22] Filed: Nov. 12, 1980

Related U.S. Application Data

[62] Division of Ser. No. 53,375, Jun. 29, 1979, Pat. No. 4,265,786.

[51] Int. Cl.³ .......................................... C10G 35/085
[52] U.S. Cl. .................................................... 208/139
[58] Field of Search ........................................... 208/139

[56] References Cited

U.S. PATENT DOCUMENTS

| | | | |
|---|---|---|---|
| 2,851,399 | 9/1958 | Brennan et al. | 252/466 PT |
| 3,729,408 | 4/1973 | Carter et al. | 252/441 |
| 3,884,799 | 5/1975 | Mahoney et al. | 252/439 |
| 4,151,115 | 4/1979 | Eberly | 252/439 |
| 4,251,391 | 2/1981 | Mauldin et al. | 208/139 |
| 4,251,392 | 2/1981 | Mauldin et al. | 208/139 |

*Primary Examiner*—Curtis R. Davis
*Attorney, Agent, or Firm*—Llewellyn A. Proctor

[57] ABSTRACT

A catalyst comprised of platinum, copper, selenium and halogen, composited with an inorganic oxide support or carrier, preferably alumina. The catalyst is one which possesses an intrinsically high activity, is stable and can operate at reforming conditions at high severities.

12 Claims, No Drawings

REFORMING WITH MULTIMETALLIC CATALYSTS

This is a division of application Ser. No. 53,375, filed 6/29/79, now U.S. Pat. No. 4,265,786.

BACKGROUND OF THE INVENTION AND PRIOR ART

Catalytic reforming, or hydroforming, is a process well known to the petroleum refining industry for improving the octane quality of naphthas and straight run gasolines. In a typical process, a series of reactors are provided with fixed beds of catalyst which receive upflow or downflow feed, and each reactor is provided with a heater, or interstage heater, because the reactions which take place are endothermic. A naphtha feed, with hydrogen, or recycle gas, is cocurrently passed sequentially through the first reactor, a reheat furnace and then to the next reactor of the series. The vapor effluent from the last reactor of the series is a gas rich in hydrogen, which usually contains small amounts of normally gaseous hydrocarbons, from which hydrogen is separated from the $C_5+$ liquid product and recycled to the process to minimize coke production; coke invariably forming and depositing on the catalyst during the reaction.

Reforming catalysts are recognized as dual functional, the catalyst composite including a metal, or metals, or a compound or compounds thereof, providing a hydrogenation-dehydrogenation (hydrogen transfer) function and an acidic component providing an isomerization function. The platinum group metals (ruthenium, osmium, rhodium, iridium, palladium and platinum), particularly platinum, have been widely used in commercial reforming operations, these metals being composited with an inorganic oxide base, particularly alumina; and in recent years promoters such as iridium, rhenium, germanium, tin, etc., have been added, particularly to platinum, to enhance one or more of certain of the characteristics which a good reforming catalyst must possess—viz., activity, selectivity, activity maintenance and yield stability. Halogen, e.g., chlorine, is generally added to provide the required acid function.

The principal reactions produced in reforming are dehydrogenation of naphthenes to produce the corresponding aromatic hydrocarbons; isomerization of n-paraffins to form branched-chain paraffins and isomerization of five membered to six membered ring compounds, and dehydrogenation of the latter to form aromatics; dehydrocyclization of paraffins to form aromatics; and hydrocracking of high molecular weight feed constituents to form lower molecular weight, or lower boiling, constituents, the net effect of these reactions being to increase the concentration of aromatics and isomers, with consequent octane improvement of naphthas boiling within the gasoline range. Hydrogenolysis, a specific and severe form of hydrocracking can also occur. This reaction which, inter alia, produces excessive amounts of methane and other hydrocarbon gases with decreased $C_5+$ liquid yields can be particularly acute with multi-metallic catalysts.

In U.S. Pat. No. 2,851,399 which issued Sept. 9, 1958 to Brennan et al., there is disclosed a reforming catalyst containing platinum and selenium composited with alumina. In U.S. Pat. No. 3,884,799 to Mahoney et al, which issued May 20, 1975, there is also disclosed a catalyst, and process for using such catalyst for reforming a catalyst hydrocarbon fraction at conventional reforming conditions, which is constituted of a Group VIII noble metal, notably platinum, and rhenium and selenium composited on a refractory inorganic oxide, notably alumina, to which is added a halogen component, notably a chloride. This reference discusses the problem of hydrogenolysis which occurs in reforming during start-up with an unsulfided, or improperly sulfided, halogenated platinum-rhenium catalyst, and it discloses and claims the process of using a catalyst in reforming in which selenium is incorporated therein thereby reducing coke formation and eliminating any necessity of a pre-sulfiding treatment of that particular catalyst to suppress hydrogenolysis during start-up.

In U.S. Pat. No. 4,161,115 to Paul E. Eberly, Jr. which issued Apr. 24, 1979, there is disclosed a reforming catalyst comprised of alumina and a Group VIII noble metal hydrogenation-dehydrogenation component, notably platinum, to which both iridium and selenium have been added to promote the activity and selectivity of the catalyst. The catalyst is prepared by a method wherein the selenium is introduced into and deposited throughout the support, and suitably the reforming catalyst contains a halogen component, particularly chlorine; and preferably the selenium component is introduced into the support, or catalyst, by impregnating same with a solution comprising selenium as an element, or a salt or compound thereof.

In copending Application Ser. Nos. 29,675 and 34,596, filed 4/13/79 and 4/30/79, respectfully, by Mauldin et al., there are also disclosed catalysts, and method for the preparation of catalyst compositions comprised of platinum or platinum and palladium, rhenium, halogen, and preferably sulfur, composited with an inorganic oxide support, or carrier, to which a small concentration of copper is added to improve the yield and stability of the catalyst in reforming. Copper is an essential component of such compositions, it having been found that excessive $C_2+$ hydrocarbon gas formation could be suppressed by the use of small and critical concentrations of copper; and that added benefits could be obtained by the further addition of sulfur to the catalyst to suppress hydrogenolysis.

It is nonetheless an objective of the present invention to provide a new and improved catalyst, and process for utilizing such catalyst for upgrading naphthas by reforming to produce higher octane gasolines.

A particular object is to provide a highly active catalyst, and process for effecting, at suitable reforming conditions, the production of high octane gasolines while minimizing hydrogenolysis and other type of hydrocracking which tend to produce methane and hydrocarbon gases of higher molecular weight than methane.

Another object is to provide catalyst which is capable of reforming feed of high sulfur level; the catalyst being particularly resistant to sulfur poisoning.

These and other objects are achieved in accordance with the present invention embodying a catalyst comprised of platinum, copper, selenium and halogen composited with an inorganic oxide support, or carrier, preferably alumina. The catalyst possesses an intrinsically high activity, and provides good yield and stability in reforming. The catalyst may also contain a sulfur component.

The catalyst is one which contains platinum as an essential component, generally in concentration ranging from about 0.1 percent to about 2 percent, preferably from about 0.2 percent to about 0.6 percent, based on the weight of the catalyst (dry basis).

The catalyst also contains copper as an essential component, generally in concentration ranging from about 0.01 percent to about 0.1 percent, preferably from about 0.025 percent to about 0.8 percent, based on the weight of the catalyst (dry basis). Preferably, the copper is composited with the catalyst in amount sufficient to provide an atom ratio of copper:platinum ranging from about 0.05:1 to about 1.54:1, preferably from about 0.12:1 to about 1.23:1. The copper component is conveniently added to the catalyst by impregnation. It is important that the concentration of copper on the catalyst be controlled to the proper level because high concentrations of copper acts as a poison and depresses catalyst activity.

Selenium is contained within the catalyst as an essential component, suitably in concentration ranging from about 0.001 to about 3 percent, preferably from about 0.01 to about 1 percent, based on the weight of the catalyst (dry basis). The selenium is incorporated into the catalyst at the time of its formation and preferably selenium is incorporated by impregnation of a solution of a soluble salt, acid or compound of selenium into the carrier. This can be carried out simultaneously with, prior to, or following the impregnation of the hydrogenation-dehydrogenation component, or other components, into the carrier. Selenium, in accordance with this invention, can be added to the carrier from a solution which contains both the salt, acid or compound of selenium, the hydrogenation-dehydrogenation component, or other components, and the inorganic acid such as HCl. Suitably, the salts or compounds are dissolved in a suitable solvent, preferably water, to form a solution, or each moiety is separately dissolved in a solution, the solutions admixed and the admixed solution used for impregnation of the carrier. The concentration of the salt or compound of selenium in the impregnation solution ranges from about 0.01 to 2 percent, preferably from about 0.01 to 1 weight percent, based on the weight of the solvent; this concentration being adequate to impregnate a sufficient amount of the selenium within the catalyst.

Halogen is an essential component, the halogen content of the catalyst generally ranging from about 0.1 to about 2.5 percent, preferably from about 0.7 to about 1.2 percent, based on the weight of the catalyst (dry basis).

Sulfur is a preferred, but not an essential component. The sulfur content of the catalyst generally ranges to about 0.2 percent, preferably from about 0.05 percent to about 0.1 percent, based on the weight of the catalyst (dry basis). The sulfur can be added to the catalyst by conventional methods, suitably by breakthrough sulfiding of a bed of the catalyst with a sulfur-containing gaseous stream, e.g., hydrogen sulfide in hydrogen, performed at temperatures of from about 350° F. to about 1050° F. and at pressures of from about 1 to about 40 atmospheres for the time necessary to achieve breakthrough, or the desired sulfur level.

The several components of the catalyst are composited with a refractory inorganic oxide support material, particularly alumina. Suitably, the copper is added first to the support, and subsequently the other components are added. The halogen component, particularly chlorine, is added along with the various components, or subsequent thereto, or both. The support can contain, for example, one or more of alumina, bentonite, clay, diatomaceous earth, zeolite, silica, activated carbon, magnesia, zirconia, thoria, and the like; though the most preferred support is alumina to which, if desired, can be added a suitable amount of other refractory carrier materials such as silica, zirconia, magnesia, titania, etc., usually in a range of about 1 to 20 percent, based on the weight of the support. A preferred support for the practice of the present invention is one having a surface area of more than 50 m$^2$/g., preferably from about 100 to about 300 m$^2$/g., a bulk density of about 0.3 to 1.0 g/ml, preferably about 0.4 to 0.8 g/ml, an average pore volume of about 0.2 to 1.1 ml/g., preferably about 0.3 to 0.8 ml/g., and an average pore diameter of about 30 to 300 Å.

The metal components can be composited or intimately associated with the porous inorganic oxide support or carrier by various techniques known to the art such as ion-exchange, coprecipitation with the alumina in the sol or gel form, and the like. For example, the catalyst composite can be formed by adding together suitable reagents such as a salts of the required metals and ammonium hydroxide or ammonium carbonate, and a salt of aluminum such as aluminum chloride or aluminum sulfate to form aluminum hydroxide. The aluminum hydroxide containing the salts can then be heated, dried, formed into pellets or extruded, and then calcined in air or other atmosphere. The metal hydrogenaton-dehydrogenation components are preferably added to the catalyst by impregnation, typically via an "incipient wetness" technique which requires a minimum of solution so that the total solution is absorbed, initially or after some evaporation.

Suitably, the copper, and other metal components are deposited on a previously pilled, pelleted, beaded, extruded, or sieved particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated by either the "incipient wetness" technique, or a technique embodying absorption from a dilute or concentrated solution, or solutions, with subsequent filtration or evaporation to effect total uptake of the metallic components.

In compositing the metals with the carrier, essentially any soluble compound of the respective metal can be used, but a soluble compound which can be easily subjected to thermal decomposition and reduction is preferred, for example, inorganic salts such as halide, nitrate, inorganic complex compounds, or organic salts such as the complex salt of acetylacetone, amine salt, and the like. In adding the copper, copper chlorides and nitrate are a preferred source of copper on the basis of availability, cost and effectiveness.

The copper is incorporated into the catalyst at the time of its formation, or thereafter, and preferably the copper is incorporated into the pre-formed carrier by impregnation from a solution of a soluble salt, or compound of copper; preferably in a solution of hydrochloric acid to provide good distribution of the copper. This step is carried out prior to the impregnation of the hydrogenation-dehydrogenation components. The copper, in accordance with this invention, can be added to the carrier from a solution which contains a salt, or compound of copper, and thereafter the copper impregnated support can be dried, calcined, and the hydrogenation-dehydrogenation components then added, suitably as salts or compounds dissolved in a suitable solvent, preferably water, to form a solution.

The impregnation of the platinum component, and other components, into a carrier is carried out by impregnating the carrier with a solution, or solutions, of the respective salts or compounds of the elements or metals to be incorporated. Salts, acids or compounds of each metal can be dissolved in a solution, or the salts, acids or compounds can be separately dissolved in solutions, the solutions admixed, and the admixed solution used for impregnation of the carrier. In other words, copper is added initially using conventional techniques, and then the other metals are added simultaneously or sequentially, suitably by impregnation. The amount of impregnation solution used should be sufficient to completely immerse the carrier, usually within the range from about 1 to 20 times of the carrier by volume, depending on the metal concentration in the impregnation solution. The impregnation treatment can be carried out under a wide range of conditions including ambient or elevated temperatures and atmospheric or supratmospheric pressures.

In a preferred embodiment of the present invention a carrier is impregnated with an aqueous halogen-acid solution of the copper. Exposure to a halogen acid can introduce substantially high levels of halogen into the carrier which is not desirable because subsequent metal impregnation is inhibited, and the catalyst can produce high acid cracking in reforming. However, excess halogen can be readily removed from the acid treated carrier by neutralization with ammonium hydroxide, suitably by contact at ambient temperature for periods ranging about 0.1 to about 1 hour, at strengths ranging from about 0.1 N to about 15 N, preferably from about 0.1 N to about 5 N. These treatments are followed by evaporation or filtration and then drying or calcination, or both, and then the metals impregnated catalyst can be further impregnated with a solution containing (1) a dissolved salt or compound of platinum, or platinum and additional metals, (2) a dissolved salt or compound of selenium, and (3) hydrochloric acid, followed by evaporation or filtration, with subsequent drying or calcination, or both, whereby the components are dispersed substantially uniformly to the inner part of the catalyst.

As suggested, a halogen component is also required. Fluorine and chlorine are preferred halogen components. The halogen is contained on the catalyst in concentration ranging from about 0.1 percent up to about 2.5 percent, preferably within the range of about 0.7 to about 1.2 percent, based on the weight of the catalyst. The introduction of halogen into catalyst can be carried out by any method and at any time of the catalyst preparation, for example, prior to, following or simultaneously with the impregnation of the platinum, copper and selenium components. In the usual operation, the halogen component is introduced simultaneously with the incorporation of these metal components. It can also be introduced by contacting a carrier material in a vapor phase or liquid phase with a halogen compound such as hydrogen fluoride, hydrogen chloride, ammonium chloride, or the like.

The catalyst, after impregnation, is dried by heating at a temperature above about 80° F., preferably between about 150° F. and 300° F., in the presence of nitrogen or oxygen, or both, in an air stream or under vacuum. The catalyst is calcined at a temperature between about 500° F. to 1200° F., preferably about 500° F. to 1050° F., in the presence of oxygen in an air stream or in the presence of an inert gas such as $N_2$ or in the presence of a mixture of $O_2$ and inert gas. This calcination or activation is conducted for periods ranging from about 1 to about 24 hours in either flowing or static gases. Reduction is performed by contact with flowing hydrogen at temperatures ranging from about 350° F. to about 1050° F. for periods ranging from about 0.5 to about 24 hours at about 1-40 atm. The catyst can be sulfided by use of a blend of $H_2S/H_2$ and performed at temperature ranging from about 350° F. to about 1050° F. at about 1-40 atm. for a time necessary to achieve breakthrough, or the desired sulfur level. Post-sulfiding stripping can be employed if desired at conditions similar to those for reduction of the catalyst.

Treatment of the catalyst with a mixture of chlorine and oxygen can be substituted for air activation if desired. This procedure can correct for any possible maldistribution of the metals arising from improper impregnation, and the procedure is useful in restoring activity during regeneration-rejuvenation after on oil service. A blend of chlorine, oxygen and nitrogen can also be employed at temperatures ranging from about 350° F. to about 1050° F. for periods ranging from about 1 to about 24 hours at 1-40 atm. Treat times for these various operations are a function of gas flow rates, gas compositions, and conditions. The catalyst halide content can be controlled during impregnation, or adjusted by treatment with water or water-hydrogen chloride blends.

This catalyst can be used in semi-regenerative, cyclic, semi-cyclic, or continuous bed reforming. It is particularly useful in cyclic reforming operations. The catalyst is particularly useful at severe reforming conditions, especially at low pressures, or pressures ranging from about 50 psig to about 150 psig, where maximum yield is favored.

The feed or charge stock can be a virgin naphtha, cracked naphtha, a Fischer-Tropsch naphtha, or the like. Typical feeds are those hydrocarbons containing from about 5 to 12 carbon atoms, or more preferably from about 6 to about 9 carbon atoms. Naphthas, or petroleum fractions boiling within the range of from about 80° F. to about 450° F., and preferably from about 125° F. to about 375° F., contain hydrocarbons of carbon numbers within these ranges. Typical fractions thus usually contain from about 20 to about 80 Vol. % paraffins, both normal and branched, which fall in the range of about $C_5$ to $C_{12}$, from about 10 to 80 Vol. % of naphthenes falling within the range of from about $C_6$ to $C_{12}$, and from 5 through 20 Vol. % of the desirable aromatics falling within the range of from about $C_6$ to $C_{12}$.

The reforming runs are initiated by adjusting the hydrogen and feed rates, and the temperature and pressure to operating conditions. The run is continued at optimum reforming conditions by adjustment of the major process variables, within the ranges described below:

| Major Operating Variables | Typical Process Conditions | Preferred Process Conditions |
|---|---|---|
| Pressure, Psig | 50–750 | 100–300 |
| Reactor Temp., °F. | 750–1100 | 850–1000 |
| Gas Rate, SCF/B (Incl. Recycle Gas) | 1500–10,000 | 2000–7000 |
| Feed Rate, V/Hr/W | 0.5–10 | 1–3 |

The invention will be more fully understood by reference to the following demonstrations and examples which present comparative data illustrating its more salient features. All parts are given in terms of weight except as otherwise specified.

EXAMPLES

A series of catalysts (Catalysts A through G) were prepared from portions of 1/16" high purity gamma alumina extrudates by calcining same in air at 1000° F. for 4 hours. Where copper was added, the extrudates were impregnated overnight with a stock solution of cuprous chloride in 1 N hydrochloric acid. The extrudates were washed with water and soaked in ammonium hydroxide solution for 1 hour to remove excess chloride. After washing with water the extrudates were impregnated with an aqueous solution of chloroplatinic acid, perrhenic acid, or selenous acid, or admixture thereof, as required, and hydrochloric acid using $CO_2$ as an impregnation aid. The catalysts were air-dried and then dried in vacuum at 130° F. overnight. The catalysts were air activated and reduced. The composition of the catalysts are given in Table I.

TABLE I

| Components | Catalysts | | | | | | |
|---|---|---|---|---|---|---|---|
| | A | B | C | D | E | F | G |
| Platinum | 0.3 | 0.3 | 0.3 | 0.3 | 0.3 | 0.3 | 0.3 |
| Selenium | 0 | 0.019 | 0 | 0.019 | 0.037 | 0 | 0.037 |
| Iridium | 0 | 0 | 0 | 0 | 0.3 | 0 | 0 |
| Copper | 0 | 0 | 0 | 0 | 0 | 0.026 | 0.026 |
| Rhenium | 0 | 0 | 0.3 | 0.3 | 0 | 0 | 0 |
| Chloride | 1.0 | 1.0 | 1.0 | 1.0 | 0.9 | 0.9 | 0.9 |
| Alumina | 98.7 | 98.7 | 98.4 | 98.4 | 98.5 | 98.8 | 98.7 |

The catalysts were each then contacted at reforming conditions in separate runs with n-heptane with the results given in Table II.

TABLE II

Heptane Reforming
932° F., 14.5 psia, 2.5 W/H/W

| Catalyst | Conversion, % | Selectivity to Aromatics, % |
|---|---|---|
| A | 79.2 | 61.9 |
| B | 76.2 | 73.4 |
| C | 50.9 | 50.4 |
| D | 70.2 | 73.7 |
| E | 66.3 | 67.8 |
| F | 82.3 | 79.3 |
| G | 85.7 | 82.8 |

These results show conversion and selectivity for the dehydrocyclization of n-heptane. This particular reaction as well as the dehydrocyclization of other n-paraffins (n-hexane, n-octane, etc.) is frequently considered one of the most difficult of reforming reactions. It is to be noted that among all the various combinations the catalyst exhibiting the highest conversion is Catalyst G consisting of 0.3% Pt-0.026% Cu-0.9% Cl-0.037% Se-$Al_2O_3$, the catalyst of this invention. It is surprising that this high conversion is accompanied by the highest selectivity to aromatics (benzene+toluene). Normally selectivity decreases with increasing conversion.

A conventional Pt catalyst (H) and a Pt-Cu-Se catalyst (I) were prepared by impregnation of calcined alumina extrudates with stock solutions of chloroplatinic acid, cuprous chloride, and selenous acid. Both catalysts were air-activated, reduced, sulfided, and hydrogen stripped. The catalyst compositions are given in Table III.

TABLE III

| Components | Catalyst H | Catalyst I |
|---|---|---|
| Pt | 0.29 | 0.30 |
| Cu | — | 0.026 |
| Se | — | 0.037 |
| S | 0.023 | 0.043 |
| Cl | 1.00 | 0.89 |
| Alumina | 98.68 | 98.71 |

Both of Catalysts H and I were evaluated for heptane reforming at 100 psig, and these catalysts are compared with a run made with Catalyst G at similar conditions; the results are given in Table IV.

TABLE IV

Heptane Reforming
932° F., 100 psig, 10 W/H/W, $H_2$/heptane = 5

| Catalyst | Yield, Wt. % | |
|---|---|---|
| | $C_5^+$ | Toluene |
| H | 83.7 | 23.4 |
| I | 86.8 | 25.8 |
| G | 86.4 | 22.7 |

These data show the sulfided form of the catalyst of this invention is superior to the sulfided conventional Pt catalysts at typical reforming conditions. Comparison of Catalysts G and I show both Pt-Cu-Se catalysts give higher yields than the sulfided Pt catalyst (H), but that the sulfided Catalyst I has better aromatization activity than the unsulfided Catalyst G. These data illustrate the additional benefit imparted to Pt-Cu-Se by the incorporation of sulfur.

It is apparent that various modifications and changes can be made without departing from the spirit and scope of the present invention, the outstanding features of which are that hydrogenolysis can be suppressed and that yield and activity maintenance can be improved even at high severity conditions.

Having described the invention, what is claimed is:

1. A process for reforming a hydrocarbon feed at reforming conditions which comprises contacting said feed with a catalyst which comprises from about about 0.1 to about 2 percent platinum, from about 0.01 to about 0.1 percent copper, from about 0.001 to about 3 percent selenium, and from about 0.1 to about 2.5 percent halogen composited with an inorganic oxide support.

2. The process of claim 1 wherein the catalyst contains from about 0.2 to about 0.6 percent platinum.

3. The process of claim 1 wherein the catalyst contains from about 0.025 to about 0.08 percent copper.

4. The process of claim 1 wherein the catalyst contains from about 0.01 to about 1 percent selenium.

5. The process of claim 1 wherein the catalyst contains from about 0.2 to about 0.6 percent platinum, from about 0.025 to about 0.08 percent copper, from about 0.01 to about 1 percent selenium, and wherein the copper is composited with the catalyst in amount sufficient to provide an atom ratio of copper:platinum ranging from about 0.12:1 to about 1.23:1.

6. The process of claim 1 wherein the catalyst contains from about 0.1 to about 2.5 percent halogen.

7. The process of claim 6 wherein the catalyst contains from about 0.7 to about 1.2 percent halogen.

8. The process of claim 1 wherein the catalyst is sulfided, and contains up to about 0.2 percent sulfur.

9. The process of claim 8 wherein the catalyst contains from about 0.05 to about 0.1 percent sulfur.

10. The process of claim 1 wherein the catalyst contains from about 0.2 to about 0.6 percent platinum, from about 0.025 to about 0.08 percent copper, and from about 0.01 to about 1 percent selenium.

11. The process of claim 10 wherein the catalyst contains from about 0.7 to about 1.2 percent halogen.

12. The process of claim 10 wherein the catalyst is sulfided, and contains from about 0.05 to about 0.1 percent sulfur.

* * * * *